(12) United States Patent
Ookuma et al.

(10) Patent No.: US 10,030,716 B2
(45) Date of Patent: Jul. 24, 2018

(54) CLUTCH MECHANISM WITH GUIDE PORTION

(71) Applicant: DENSO CORPORATION, Kariya, Aichi-pref. (JP)

(72) Inventors: Tooru Ookuma, Kariya (JP); Motohiko Ueda, Okazaki (JP); Yousuke Yamagami, Obu (JP); Yuichiro Okuda, Toyoake (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 154 days.

(21) Appl. No.: 14/646,413

(22) PCT Filed: Oct. 2, 2013

(86) PCT No.: PCT/JP2013/005865
§ 371 (c)(1),
(2) Date: May 21, 2015

(87) PCT Pub. No.: WO2014/080560
PCT Pub. Date: May 30, 2014

(65) Prior Publication Data
US 2015/0292574 A1    Oct. 15, 2015

(30) Foreign Application Priority Data
Nov. 23, 2012    (JP) .................................. 2012-256962

(51) Int. Cl.
*F16D 27/14*    (2006.01)
*F16D 13/76*    (2006.01)
(Continued)

(52) U.S. Cl.
CPC .............. *F16D 27/14* (2013.01); *F16D 13/76* (2013.01); *F16D 27/004* (2013.01); *F16D 27/112* (2013.01)

(58) Field of Classification Search
CPC ....................................................... F16D 27/09
See application file for complete search history.

(56) References Cited

U.S. PATENT DOCUMENTS

2009/0127059 A1* 5/2009 Knoblauch ........... F16D 27/004
                                                            192/84.92
2009/0321214 A1* 12/2009 Hoshino ............... F16D 27/004
                                                            192/84.961
(Continued)

FOREIGN PATENT DOCUMENTS

JP        S62271404 A    11/1987
JP        H06050357 A    2/1994
(Continued)

OTHER PUBLICATIONS

Office Action dated Dec. 1, 2015 issued in the corresponding JP application No. 2012-256962 in Japanese with English translation.
(Continued)

*Primary Examiner* — Huan Le
*Assistant Examiner* — Lori Wu
(74) *Attorney, Agent, or Firm* — Harness, Dickey & Pierce, P.L.C.

(57) ABSTRACT

When a control unit starts to supply power to an electromagnetic coil in a first direction, a magnetic force generated by a non-attracting magnetic circuit becomes larger than a magnetic attraction force generated by an attracting magnetic circuit. As a result, a movable member is guided by a guide portion of a yoke and moves to a second position from a first position. When the control unit starts to supply power to an electromagnetic coil in a second direction, the magnetic attraction force generated by the attracting magnetic circuit becomes larger than the magnetic force generated by the non-attracting magnetic circuit. As a result, the movable member is guided by the guide portion and moves to the first (Continued)

position from the second position. Accordingly, the movable member can reliably perform a moving operation when turning ON/OFF.

17 Claims, 8 Drawing Sheets

(51) Int. Cl.
*F16D 27/00* (2006.01)
*F16D 27/112* (2006.01)

(56) References Cited

U.S. PATENT DOCUMENTS

2010/0033066 A1* 2/2010 Murata ................. F02N 11/087
   310/68 R
2011/0083935 A1* 4/2011 Katano ................. F16D 27/004
   192/84.31

FOREIGN PATENT DOCUMENTS

| JP | 2000283031 A | 10/2000 |
| JP | 2006336745 A | 12/2006 |
| JP | 2011080579 A | 4/2011 |

OTHER PUBLICATIONS

International Search Report and Written Opinion (in Japanese with English Translation) for PCT/JP2013/005865, dated Nov. 12, 2013; ISA/JP.

\* cited by examiner

FIG. 7
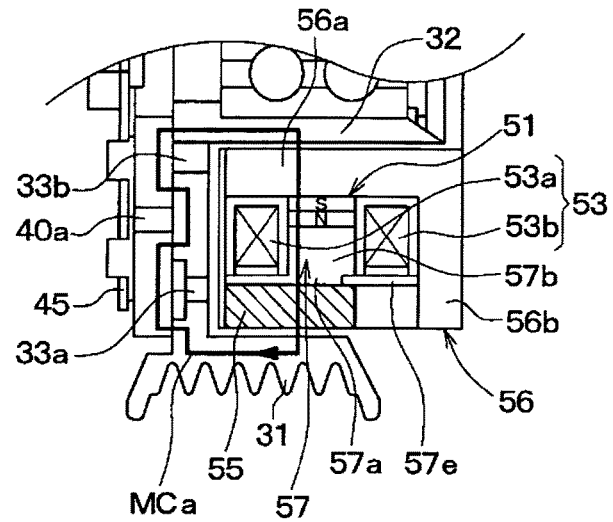
FIG. 8
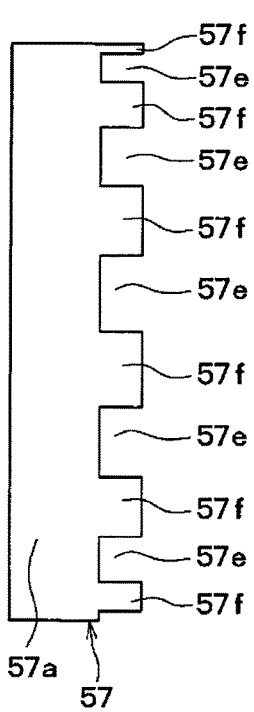
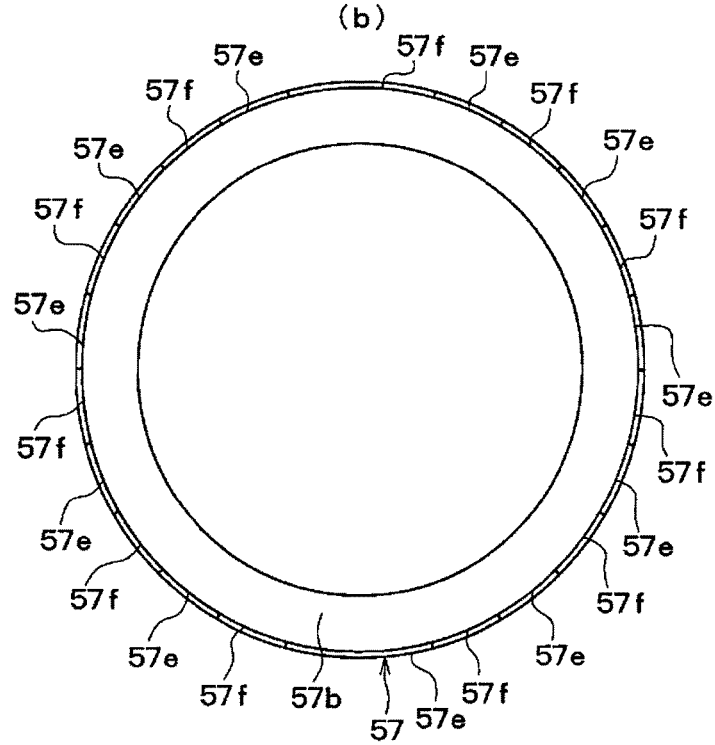

CLUTCH MECHANISM WITH GUIDE PORTION

CROSS-REFERENCE TO RELATED APPLICATIONS

This application is a U.S. National Phase Application under 35 U.S.C. 371 of International Application No. PCT/JP2013/005865 filed on Oct. 2, 2013 and published in Japanese as WO 2014/080560 A1 on May 30, 2014. This application is based on and claims the benefit of priority from Japanese Patent Application No. 2012-256962 filed on Nov. 23, 2012. The entire disclosures of all of the above applications are incorporated herein by reference.

TECHNICAL FIELD

The present disclosure relates to a clutch mechanism.

BACKGROUND ART

An electromagnetic clutch mechanism, which intermittently transmits a rotational drive force to a driven-side rotating body from a driving-side rotating body by intermittently supplying power to an electromagnet, has been known in the related art. This kind of clutch mechanism generally connects the driving-side rotating body to the driven-side rotating body to transmit a rotational drive force by supplying power to the electromagnet. Further, the clutch mechanism separates the driving-side rotating body from the driven-side rotating body to cut off the transmission of a rotational drive force by not supplying power to the electromagnet.

However, power should always be supplied to the electromagnet in this kind of electromagnetic clutch mechanism when the clutch mechanism connects the driving-side rotating body to the driven-side rotating body to transmit a rotational drive force. For this reason, there is a concern that power consumption (energy consumption) may increase at the time of transmission of power.

In contrast, Patent Literature 1 proposes a so-called self-holding type clutch mechanism. In the self-holding type clutch mechanism, a permanent magnet is used and power needs to be supplied to an electromagnet only when a driving-side rotating body and a driven-side rotating body are connected to each other and only when the driving-side rotating body and the driven-side rotating body are separated from each other, thereby reducing power consumption.

The self-holding type clutch mechanism includes an electromagnetic coil that includes first and second coil portions, a hollow cylindrical permanent magnet that is interposed between the first and second coil portions, and a movable member. The first and second coil portions are formed in the shape of a ring having the center thereof on a rotating shaft of a compressor, and are disposed along an axial direction of the rotating shaft. The movable member is formed in the shape of a ring having the center thereof on the rotating shaft, and is adapted to be movable in the axial direction.

In the self-holding type clutch mechanism, the movable member is disposed outside the first and second coil portions and the permanent magnet in a radial direction of the rotating shaft. Further, the permanent magnet generates an attracting magnetic circuit that generates magnetic attraction causing a driving-side rotating body and driven-side rotating body to be connected, and a non-attracting magnetic circuit that does not generate magnetic attraction. The self-holding type clutch mechanism is provided with an elastic member that applies an elastic force in a direction in which the driving-side rotating body and the driven-side rotating body are separated from each other.

For example, current is made to flow in the first and second coil portions in a first direction. Accordingly, a magnetic force generated from the attracting magnetic circuit is reduced by an electromagnetic force that is generated from the first coil portion, and a magnetic force generated from the non-attracting magnetic circuit is increased by an electromagnetic force that is generated from the second coil portion.

As a result, the magnetic force generated from the non-attracting magnetic circuit becomes larger than the magnetic force generated from the attracting magnetic circuit. At this time, the movable member is moved to one side in the axial direction through the magnetic force that is generated from the non-attracting magnetic circuit. Accordingly, an elastic force of the elastic member becomes larger than the magnetic attraction generated from the attracting magnetic circuit, so that the driving-side rotating body and the driven-side rotating body are separated from each other by the elastic force of the elastic member. That is, the clutch mechanism is in an OFF state.

Meanwhile, current is made to flow in the first and second coil portions in a second direction different from the first direction. Accordingly, the magnetic force generated from the attracting magnetic circuit is increased by the electromagnetic force generated from the first coil portion, and the magnetic force generated from the non-attracting magnetic circuit is reduced by the electromagnetic force generated from the second coil portion.

As a result, the magnetic force generated from the attracting magnetic circuit becomes larger than the magnetic force generated from the non-attracting magnetic circuit. At this time, the movable member is moved to the other side in the axial direction through the magnetic force that is generated from the attracting magnetic circuit. Accordingly, the magnetic force generated from the attracting magnetic circuit becomes larger than an elastic force of the elastic member, so that the driving-side rotating body and the driven-side rotating body are connected to each other. That is, the clutch mechanism is in an ON state.

When current is made to flow in the first and second coil portions in the first or second direction as described above, the movable member is moved to one side or the other side in the axial direction so that the clutch mechanism can be turned on/off.

PRIOR ART LITERATURE

Patent Literature

Patent Literature 1: JP 2011-80579 A

SUMMARY OF INVENTION

In the self-holding type clutch mechanism, a drive force moving the movable member in the axial direction is generated through the magnetic forces generated from the first and second coil portions, and the movable member is moved in the axial direction by the drive force. Accordingly, the clutch mechanism can be turned on/off. However, according to the consideration of the present application's inventor, there is a concern that reliable operation of the movable member may be hindered since various factors affect the movement of the movable member.

For example, when the movable member comes into direct contact with the permanent magnet, a friction force is generated due to a large radial load. At this time, the friction force may become larger than the drive force which is applied to the movable member, the drive force being based on the magnetic forces generated from the first and second coil portions. Accordingly, there is a possibility that the movable member cannot be moved.

Further, when a dimensional difference exists between the outer diameter of the permanent magnet and the outer diameters of the first and second coil portions due to measurement errors caused during manufacturing, a level difference is generated between the permanent magnet and the first and second coil portions. For this reason, even though a drive force is applied to the movable member on the basis of the magnetic forces generated from the first and second coil portions, there is a possibility that the movable member is caught due to a level difference. In this case, since the movable member cannot be moved, there is a concern that the clutch mechanism may malfunction.

The present disclosure has been made in consideration of the above-mentioned points, and an object of the present disclosure is to achieve reliable movement of a movable member by the addition of a guide portion of the movable member in a clutch mechanism that is turned on and off by the movement of the movable member.

To achieve the above-mentioned object(s), a first aspect of the present disclosure includes a driving-side rotating body that is rotated by a rotational drive force output from a drive source, a driven-side rotating body, to which the rotational drive force is transmitted, that is connected to the driving-side rotating body, a permanent magnet that forms, together with the driving-side rotating body and the driven-side rotating body, an attracting magnetic circuit which generates a magnetic force that causes the driving-side rotating body and the driven-side rotating body to be connected to each other, the permanent magnet forming a non-attracting magnetic circuit different from the attracting magnetic circuit, an electromagnetic coil that changes a magnetic force generated from the attracting magnetic circuit and a magnetic force generated from the non-attracting magnetic circuit, a movable member that is made of a magnetic material and is a displaceable member, the movable member positioning at a first position where a magnetic resistance of the attracting magnetic circuit is smaller when the driving-side rotating body and the driven-side rotating body are connected to each other than when the driving-side rotating body and the driven-side rotating body are separated from each other, and the movable member positioning at a second position where the magnetic resistance of the non-attracting magnetic circuit is smaller when the driving-side rotating body and the driven-side rotating body are separated from each other than when the driving-side rotating body and the driven-side rotating body are connected to each other, a first control unit that moves the movable member, to a side of the first position from a side of the second position using the magnetic force generated from the attracting magnetic circuit, by supplying power to the electromagnetic coil so that the magnetic force generated from the attracting magnetic circuit is larger than the magnetic force generated from the non-attracting magnetic circuit, a second control unit that moves the movable member, to the side of the second position from the side of the first position using the magnetic force generated from the non-attracting magnetic circuit, by supplying power to the electromagnetic coil so that the magnetic force generated from the non-attracting magnetic circuit is larger than the magnetic force generated from the attracting magnetic circuit, and a guide portion that guides movement of the movable member between the side of the first position and the side of the second position.

According to the first aspect, the movable member is guided by the guide portion and can move between the first position and the second position. For this reason, the movable member can be reliably moved between the first position and the second position. As a result, since the driving-side rotating body and the driven-side rotating body can be reliably connected to each other or separated from each other, reliable operation of the clutch mechanism is obtained.

Further, according to a second aspect of the present disclosure, the guide portion includes a first magnetic portion that is disposed adjacent to the first coil portion and is made of a magnetic material, and a non-magnetic portion that is disposed adjacent to the second coil portion and is made of a non-magnetic material, the first magnetic portion forms the attracting magnetic circuit and the non-attracting magnetic circuit, and the non-magnetic portion suppresses leakage of magnetic flux from the attracting magnetic circuit.

Here, for example, when magnetic flux leaks from the attracting magnetic circuit, a magnetic force causing the driving-side rotating body and the driven-side rotating body to be connected to each other is reduced.

In the second aspect, since the non-magnetic portion suppresses the leakage of magnetic flux from the attracting magnetic circuit when the movable member is positioned at the first position, the reduction of a magnetic force causing the driving-side rotating body and the driven-side rotating body to be connected to each other can be suppressed. Accordingly, the driving-side rotating body and the driven-side rotating body can be reliably connected to each other.

Further, in a third aspect of the present disclosure, a film, which allows the movable member to smoothly slide, is formed, through surface treatment, on a surface of the guide portion facing the movable member.

Accordingly, the sliding state of the guide portion can be maintained well over the life of a product, and the operability of the guide portion can be maintained.

In a fourth aspect of the present disclosure, heat treatment, which suppresses wear with the movable member, is performed on a side of the guide portion that faces the movable member.

Accordingly, the sliding state of the guide portion can be maintained well over the life of a product, and the operability of the guide portion can be maintained.

In a fifth aspect of the present disclosure, a film, which allows the movable member to smoothly slide on the guide portion, is formed, through surface treatment, on a surface of the movable member that faces the guide portion.

Accordingly, the sliding state of the movable member can be maintained well over the life of a product, and the operability of the movable member can be maintained.

In a sixth aspect of the present disclosure, heat treatment, which suppresses wear with the movable member, is performed on a side of the movable member that faces the guide portion.

Accordingly, the sliding state of the movable member can be maintained well over the life of a product, and the operability of the movable member can be maintained.

BRIEF DESCRIPTION OF DRAWINGS

FIG. 7 is a view showing a part of a clutch structure of a third embodiment of the present disclosure.

FIG. 8 is a side view and a front view of a yoke of a fourth embodiment of the present disclosure.

EMBODIMENTS FOR CARRYING OUT THE INVENTION

Figure 1:
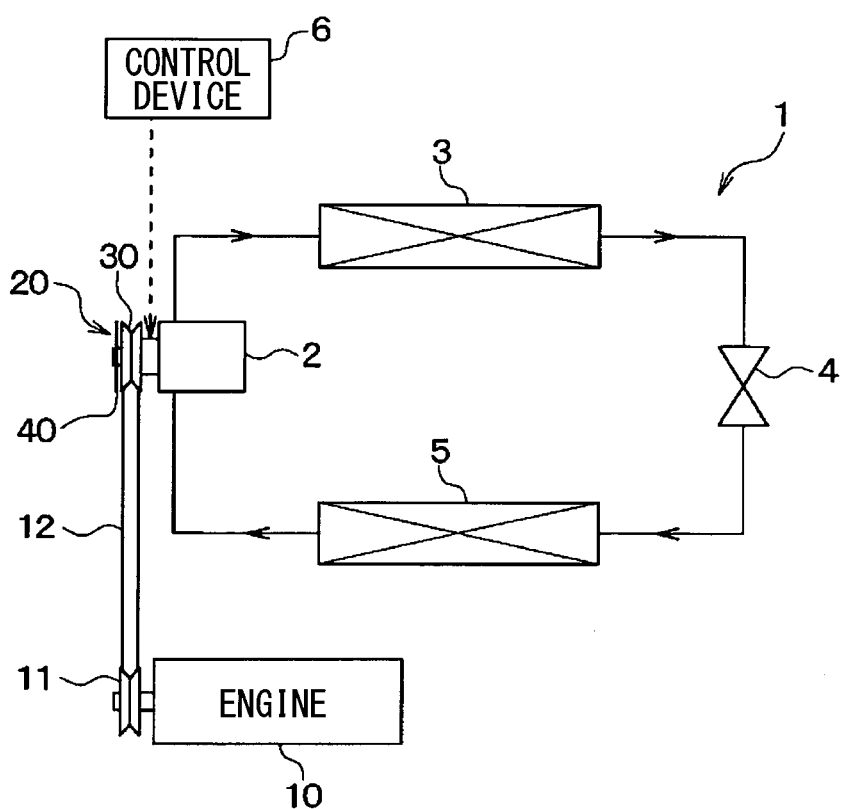
FIG. 1 is a view showing the entire configuration of a refrigeration cycle device of a first embodiment to which a clutch structure of the present disclosure is applied.

Embodiments of the present disclosure will be described below with reference to the drawings. Portions of each embodiment corresponding to items, which have been described in the previous embodiments, may be denoted by the same reference numerals and repeated descriptions thereof may be omitted in each embodiment. When only a part of the structure of each embodiment is described, the other embodiments having been previously described can be applied to the other parts of the structure. Portions, of which the possibility of the combination has been specifically described clearly in each embodiment, can be combined with each other, and embodiments can also be partially combined with each other if a problem does not particularly occur in combination even if the combination is not described clearly.

First Embodiment

FIG. 1 is a view showing the entire configuration of a refrigeration cycle device 1 of a vehicle air conditioner to which a clutch mechanism 20 of the present embodiment is applied.

The refrigeration cycle device 1 includes a compressor 2, a radiator 3, an expansion valve 4, and an evaporator 5 that are connected to each other. The compressor 2 sucks in a refrigerant and compresses the refrigerant. The radiator 3 causes the refrigerant, which is discharged from the compressor 2, to radiate heat. The expansion valve 4 depressurizes and expands the refrigerant that flows out of the radiator 3. The evaporator 5 exhibits a heat absorbing effect by evaporating the refrigerant that has been depressurized by the expansion valve 4.

The compressor 2 is installed in the engine room of a vehicle. The compressor 2 drives a compression mechanism by a rotational drive force, which is applied from an engine 10 as a propulsion-drive source through the clutch mechanism 20, to suck in a refrigerant from the evaporator 5 and compress the refrigerant.

Meanwhile, any one of a fixed-capacity compression mechanism of which the discharge capacity is fixed, and a variable-capacity compression mechanism of which the discharge capacity can be adjusted by an external control signal, may be employed as the compression mechanism.

The clutch mechanism 20 of the present embodiment is a clutch mechanism that is connected to the compressor 2 and is integrated with a pulley. The clutch mechanism 20 transmits the rotational drive force of the engine 10, which is applied from an engine-side pulley 11 through a V-belt 12, to the compressor 2. The engine-side pulley 11 is connected to a rotation drive shaft of the engine 10.

The clutch mechanism 20 includes a pulley 30 and an armature 40. The pulley 30 forms a driving-side rotating body that is rotated by the rotational drive force applied from the engine 10 through the V-belt 12. The armature 40 forms a driven-side rotating body that is connected to a rotating shaft 2a of the compressor 2. The clutch mechanism 20 intermittently transmits a rotational drive force to the compressor 2 from the engine 10 by connecting the pulley 30 to the armature 40 or separating the pulley 30 from the armature 40.

That is, when the clutch mechanism 20 connects the pulley 30 to the armature 40, the rotational drive force of the engine 10 is transmitted to the compressor 2. Accordingly, the refrigeration cycle device 1 operates. Meanwhile, when the clutch mechanism 20 separates the pulley 30 from the armature 40, the rotational drive force of the engine 10 is not transmitted to the compressor 2. Accordingly, the refrigeration cycle device 1 does not operate.

Next, the detailed structure of the clutch mechanism 20 of the present embodiment will be described with reference to FIGS. 2, 3, and 4.

Figure 2:
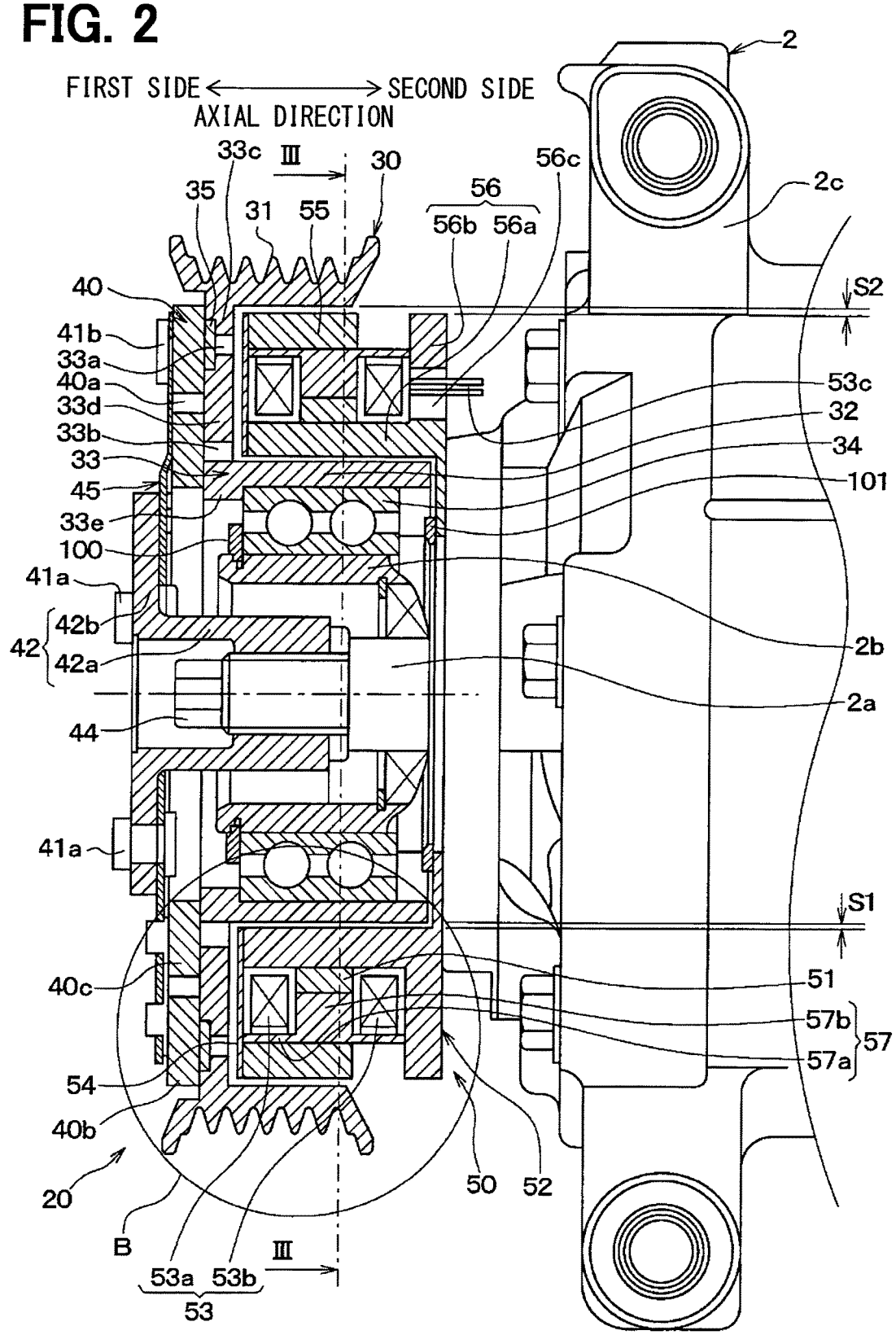
FIG. 2 is a cross-sectional view of the clutch structure of the first embodiment.
Figure 3:
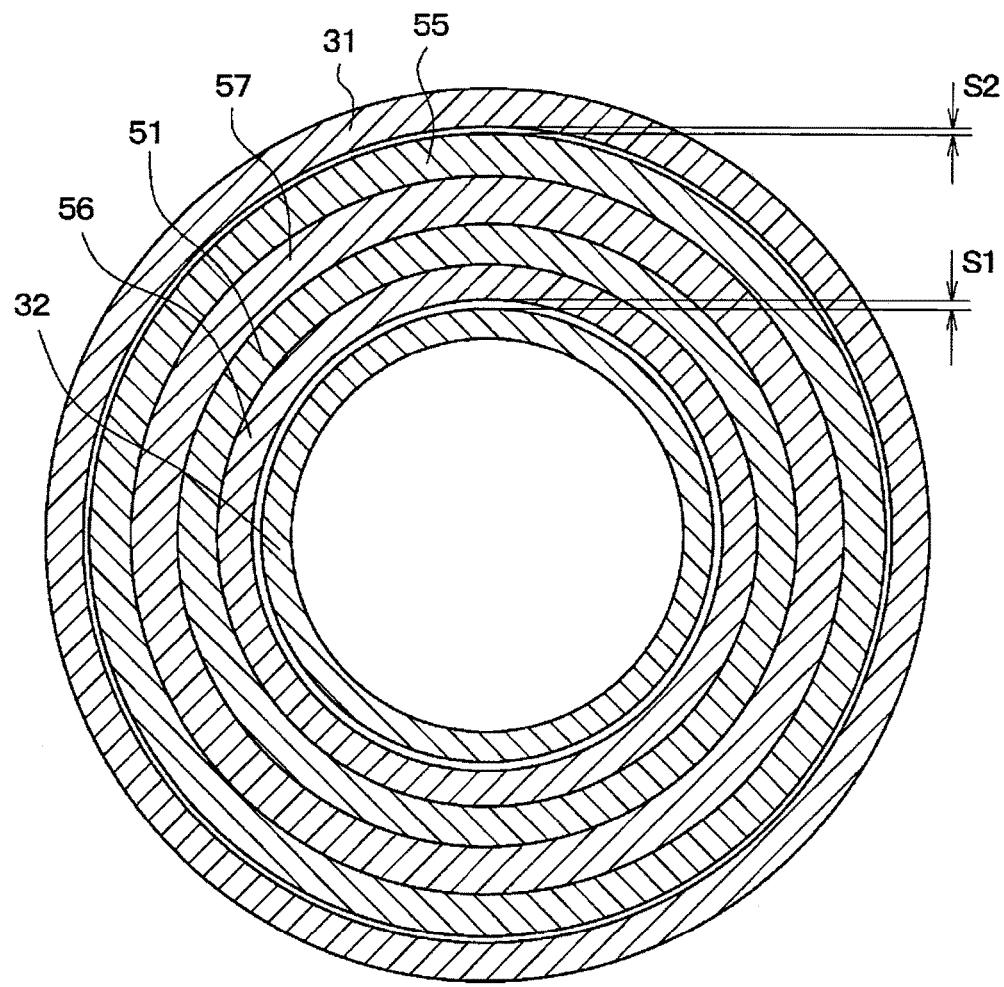
FIG. 3 is a cross-sectional view taken along line III-III of FIG. 2.

FIG. 2 is an axial cross-sectional view of the clutch mechanism 20. This axial cross-sectional view is a cross-sectional view of the clutch mechanism 20 that includes an axis of the rotating shaft 2a of the compressor 2 and is taken along the axis. FIG. 3 is a cross-sectional view taken along line III-III of FIG. 2. FIG. 2 shows a state in which the pulley 30 and the armature 40 are connected to each other. FIG. 4 is a view showing a portion B of FIG. 2. Meanwhile, in the following description, one side (the left side in FIG. 2) of the clutch mechanism 20 in an axial direction (a rotation axis direction) may be referred to as a first side and the other side (the right side in FIG. 2) thereof may be referred to as a second side.

As shown in FIG. 2, the clutch mechanism 20 includes a stator 50 in addition to the pulley 30 and the armature 40.

First, the pulley 30 includes an outer cylindrical portion 31, an inner cylindrical portion 32, and an end face portion 33.

The outer cylindrical portion 31 is formed in the shape of a cylinder that has the center line thereof on the axis of the rotating shaft 2a (one-dot chain line in FIG. 2). V grooves (specifically, poly V-grooves) on which the V-belt 12 is wound are formed on the outer peripheral of the outer cylindrical portion 31.

An outer race of a ball bearing 34 is fixed to the inner peripheral of the inner cylindrical portion 32. The ball bearing 34 fixes the pulley 30 to a housing 2c, which forms the outer shell of the compressor 2, so as to allow the pulley 30 to rotate about the axis of the rotating shaft 2a of the compressor 2 as a center line. For this purpose, an inner race of the ball bearing 34 is fixed to the housing 2c of the compressor 2 by a fixing member such as a snap ring 100. The inner race of the ball bearing 34 is disposed outside a housing boss 2b, which is formed on the housing 2c of the compressor 2, in a radial direction. The housing boss 2b is formed in the shape of a cylinder that has the center line thereof on the axis of the rotating shaft 2a of the compressor 2.

The inner cylindrical portion 32 is disposed on the inner peripheral side of the outer cylindrical portion 31 and is formed in the shape of a cylinder that has the axis thereof on the axis of the rotating shaft 2a of the compressor 2.

Both the outer cylindrical portion 31 and the inner cylindrical portion 32 of the present embodiment are made of a magnetic material (for example, iron), and form an attracting magnetic circuit MCa as described below (see FIG. 4).

The end face portion 33 spreads in a direction perpendicular to the rotating shaft (a radial direction) so as to connect one end portion of the outer cylindrical portion 31 in the axial direction to one end portion of the inner cylindrical portion 32 in the axial direction, and includes a circular through hole that is formed in the central portion thereof so as to penetrate both surfaces thereof.

Specifically, the end face portion 33 includes ring members 33c, 33d, and 33e that are made of a magnetic material (for example, iron). Each of the ring members 33c, 33d, and 33e is formed in the shape of a ring that has the center thereof on the axis of the rotating shaft 2a. The ring members 33c, 33d, and 33e are disposed so as to be offset from one another in the radial direction. The ring member 33c is disposed outside the ring member 33d in the radial direction. The ring member 33d is disposed outside the ring member 33e in the radial direction.

A non-magnetic portion 33a is provided between the ring members 33c and 33d. The non-magnetic portion 33a is formed in the shape of a ring that has the center thereof on the axis of the rotating shaft 2a. The non-magnetic portion 33a includes gaps (air gaps) and bridge portions that are arranged along a circumferential direction. The bridge portions are made of a magnetic material (for example, iron) or a non-magnetic metal material, and are used to connect the ring member 33c to the ring member 33d.

A non-magnetic portion 33b is provided between the ring members 33d and 33e. The non-magnetic portion 33b is formed in the shape of a ring that has the center thereof on the axis of the rotating shaft 2a. The non-magnetic portion 33b includes gaps and bridge portions that are arranged along the circumferential direction. The bridge portions are made of a magnetic material (for example, iron) or a non-magnetic metal material, and are used to connect the ring member 33d to the ring member 33e.

The outer cylindrical portion 31, the inner cylindrical portion 32, and the end face portion 33 are integrally formed in the present embodiment. For this reason, the ring member 33e is connected to the inner cylindrical portion 32. The ring member 33c is connected to the outer cylindrical portion 31.

The surface of the end face portion 33, which corresponds to the first side, forms a friction surface that comes into contact with the armature 40 when the pulley 30 and the armature 40 are connected to each other. Moreover, in the present embodiment, a friction member 35, which increases the coefficient of friction of the end face portion 33, is disposed on the first side of the end face portion 33. The friction member 35 is formed of a non-magnetic material, and specifically, a material obtained by solidifying alumina with a resin, or a sintered material of metal powder (for example, aluminum powder) can be employed.

The armature 40 is a disc-shaped member that spreads in a direction perpendicular to the rotating shaft 2a and includes a through hole formed in the central portion thereof so as to penetrate both surfaces thereof. The armature 40 forms the attracting magnetic circuit MCa as described below. The center of rotation of the armature 40 of the present embodiment corresponds to the axis of the rotating shaft 2a.

Specifically, the armature 40 includes ring members 40b and 40c that are made of a magnetic material (for example, iron). Each of the ring members 40b and 40c is formed in the shape of a ring that has the center thereof on the axis of the rotating shaft 2a. The ring member 40b is disposed outside the ring member 40c in the radial direction. A non-magnetic portion 40a is provided between the ring members 40b and 40c. The non-magnetic portion 40a includes gaps and bridge portions that are arranged along the circumferential direction. The bridge portions are made of a magnetic material (for example, iron) or a non-magnetic metal material, and are used to connect the ring member 40b to the ring member 40c.

The non-magnetic portion 40a of the armature 40 of the present embodiment is disposed so as to be offset from the non-magnetic portions 33a and 33b of the pulley 30 in the radial direction.

The flat surface of the armature 40, which corresponds to the second side, faces the end face portion 33 of the pulley 30, and forms a friction surface that comes into contact with the pulley 30 when the pulley 30 and the armature 40 are connected to each other. A disc-shaped hub 42 is disposed on the first side of the armature 40.

The hub 42 forms a connecting member that connects the armature 40 to the rotating shaft 2a of the compressor 2. Specifically, the hub 42 includes a cylindrical portion 42a that extends in the rotation axis direction and a flange portion 42b that extends from an end portion of the cylindrical portion 42a corresponding to the first side in a direction perpendicular to the rotating shaft.

A leaf spring 45, which spreads in the direction perpendicular to the rotating shaft, is disposed between the hub 42 and the armature 40. The leaf spring 45 is fixed to the flange portion 42b of the hub 42 by a rivet 41a.

Here, the leaf spring 45 is fixed to the armature 40 by a rivet 41b. The leaf spring 45 applies an elastic force to the hub 42 in the direction in which the armature 40 is separated from the pulley 30. When the pulley 30 and the armature 40 are separated from each other, a predetermined clearance S3 (see FIG. 4 to be described below) is formed between the armature 40 connected to the hub 42 and the end face portion 33 of the pulley 30 by this elastic force.

The cylindrical portion 42a is fastened to the rotating shaft 2a of the compressor 2 by a bolt 44, so that the hub 42 is fixed. Meanwhile, fasteners, such as splines (serrations) or key grooves, may be used to fix the hub 42 to the rotating shaft 2a of the compressor 2.

The armature 40, the hub 42, the leaf spring 45, and the rotating shaft 2a of the compressor 2 are fixed as described above. Further, when the pulley 30 and the armature 40 are connected to each other, the pulley 30, the armature 40, the hub 42, the leaf spring 45, and the rotating shaft 2a of the compressor 2 rotate about the axes thereof as the center line.

Furthermore, the stator 50 is a stator assembly that includes a permanent magnet 51, an electromagnetic coil 53, a stopper portion 54, a movable member 55, a stator housing 56, and a yoke 57.

The permanent magnet 51 is formed in the shape of a ring that has a center on the axis of the rotating shaft 2a of the compressor 2. An outer peripheral portion of the permanent magnet 51 forms an N pole, and an inner peripheral portion of the permanent magnet 51 forms an S pole. The permanent magnet 51 forms an attracting magnetic circuit MCa and a non-attracting magnetic circuit MCb as described below.

Meanwhile, neodymium or samarium cobalt can be employed as a material of the permanent magnet 51 of the present embodiment. The permanent magnet 51, the electromagnetic coil 53, the stopper portion 54, the stator housing 56, and the yoke 57 are fastened by fitting, so that a ring-shaped structure 52 is formed.

The electromagnetic coil 53 includes a first coil portion 53a and a second coil portion 53b. The first and second coil portions 53a and 53b are connected to each other in series or in parallel. Each of the first and second coil portions 53a and 53b is formed in the shape of a ring that has the center thereof on the axis of the rotating shaft 2a of the compressor 2.

The first coil portion 53a is disposed on the first side of the permanent magnet 51 in the axial direction. The second coil portion 53b is disposed on the second side of the permanent magnet 51 in the axial direction. That is, the permanent magnet 51 is interposed between the first and second coil portions 53a and 53b.

A coil wire made of copper, aluminum, or the like is wound on a spool, which is molded with, for example, a resin, so as to form multiple lines and multiple layers, so that the first and second coil portions 53a and 53b of the present embodiment are formed.

The movable member 55 is disposed outside the permanent magnet 51 and the electromagnetic coil 53 in the axial direction of the rotating shaft 2a. Specifically, the movable member 55 is disposed with a clearance interposed between the movable member 55 and the yoke 57 on the outside of the yoke 57 in the axial direction of the rotating shaft 2a.

The movable member 55 is formed in the shape of a cylinder that has the center thereof on the axis of the rotating shaft 2a. The movable member 55 is disposed inside the outer cylindrical portion 31 in the radial direction of the rotating shaft 2a. A clearance S2 is formed between the movable member 55 and the outer cylindrical portion 31. Accordingly, the movable member 55 is adapted to be movable relative to the yoke 57 in the axial direction of the rotating shaft 2a (a thrust direction). The movable member 55 of the present embodiment is made of a magnetic material (for example, iron).

Here, the entire length of the movable member 55 in the rotation axis direction is shorter than the entire length of the structure 52 in the rotation axis direction. Accordingly, when the movable member 55 is positioned at a position on the first side in the axial direction (hereinafter, referred to as a first position), a gap (air gap) is formed on the second side in the axial direction. The gap increases the magnetic resistance of the non-attracting magnetic circuit MCb that is formed by the permanent magnet 51 on the side opposite to the end face portion 33 of the pulley 30.

In contrast, when the movable member 55 is positioned at a position on the second side in the axial direction (hereinafter, referred to as a second position), a gap is formed on the first side in the axial direction. The gap increases the magnetic resistance of the attracting magnetic circuit MCa that is formed by the permanent magnet 51 on the end face portion 33 of the pulley 30.

Both of the magnetic resistance of the attracting magnetic circuit MCa and the magnetic resistance of the non-attracting magnetic circuit MCb can be changed as described below by the movement of the movable member 55 in the axial direction.

Heat treatment (for example, quenching or tempering), which suppresses the wear of the movable member 55 by increasing the hardness of the movable member 55, is performed on the movable member 55 of the present embodiment.

The stopper portion 54 is disposed on the first side of the movable member 55 and the first coil portion 53a of the electromagnetic coil 53 in the axial direction. The stopper portion 54 makes the movable member 55 collide with itself to stop the first side of the movable member 55 in the axial direction.

The stator housing 56 includes a cylinder portion 56a and a wall portion 56b. The cylinder portion 56a is disposed inside the permanent magnet 51 and the electromagnetic coil 53 in the radial direction of the rotating shaft 2a. The cylinder portion 56a is formed in the shape of a cylinder that has the center thereof on the axis of the rotating shaft 2a. The wall portion 56b is formed in the shape of a ring that extends from the second side of the cylinder portion 56a to the outward side in the radial direction of the rotating shaft 2a. The cylinder portion 56a and the wall portion 56b are made of a magnetic material (for example, iron) so as to be formed integrally with each other, and form each of the attracting magnetic circuit MCa and the non-attracting magnetic circuit MCb.

Meanwhile, a through hole 56c through which electric wires 53c, which connect the electromagnetic coil 53 to a control unit 6 (first and second control units), pass is formed in the wall portion 56b of the stator housing 56.

The stator housing 56 of the present embodiment is fixed to the housing 2c of the compressor 2 with fasteners such as a snap ring 101. Accordingly, the structure 52 is fixed to the housing 2c of the compressor 2. Further, a clearance S1 is formed between the cylinder portion 56a of the stator housing 56 and the inner cylindrical portion 32 of the pulley 30.

The yoke 57 includes a guide portion 57a and an intermediate magnetic portion 57b. The guide portion 57a is formed in the shape of a cylinder that has the center thereof on the axis of the rotating shaft 2a. The outer peripheral surface of the guide portion 57a is formed so as to be smooth in the axial direction of the rotating shaft 2a.

A solid lubricant film is formed on the outer peripheral surface of the guide portion 57a (that is, the surface of the guide portion 57a facing the movable member 55) through surface treatment. The surface treatment ensures a satisfactory sliding state between the movable member 55 and the guide portion 57a. Further, the surface treatment is used to form a solid lubricant film that reduces a coefficient μ of friction and improves wear resistance between the movable member 55 and the guide portion 57a.

Here, materials including a material having a solid lubricant effect, such as molybdenum, fluorine, or graphite, as a main component are preferable as surface treatment materials used for the surface treatment that forms the solid lubricant film. It is preferable that the thickness of the solid lubricant film is in the range of about 10 to 20μ.

The guide portion 57a of the present embodiment guides the movement of the movable member 55 in the axial direction as described below.

The intermediate magnetic portion 57b is interposed between the first and second coil portions 53a and 53b. The guide portion 57a and the intermediate magnetic portion 57b are made of a magnetic material (for example, iron) so as to be formed integrally with each other, and form each of the attracting magnetic circuit MCa and the non-attracting magnetic circuit MCb.

Further, the control unit 6 of FIG. 1 controls the supply of power to the first and second coil portions 53a and 53b on the basis of a control signal that is output from an air conditioner ECU (an electronic control unit).

Next, the operation of the clutch mechanism 20 of the present embodiment will be described with reference to FIG. 4. FIG. 4 is a view using the cross-sectional view of the portion B of FIG. 2.

Figure 4:
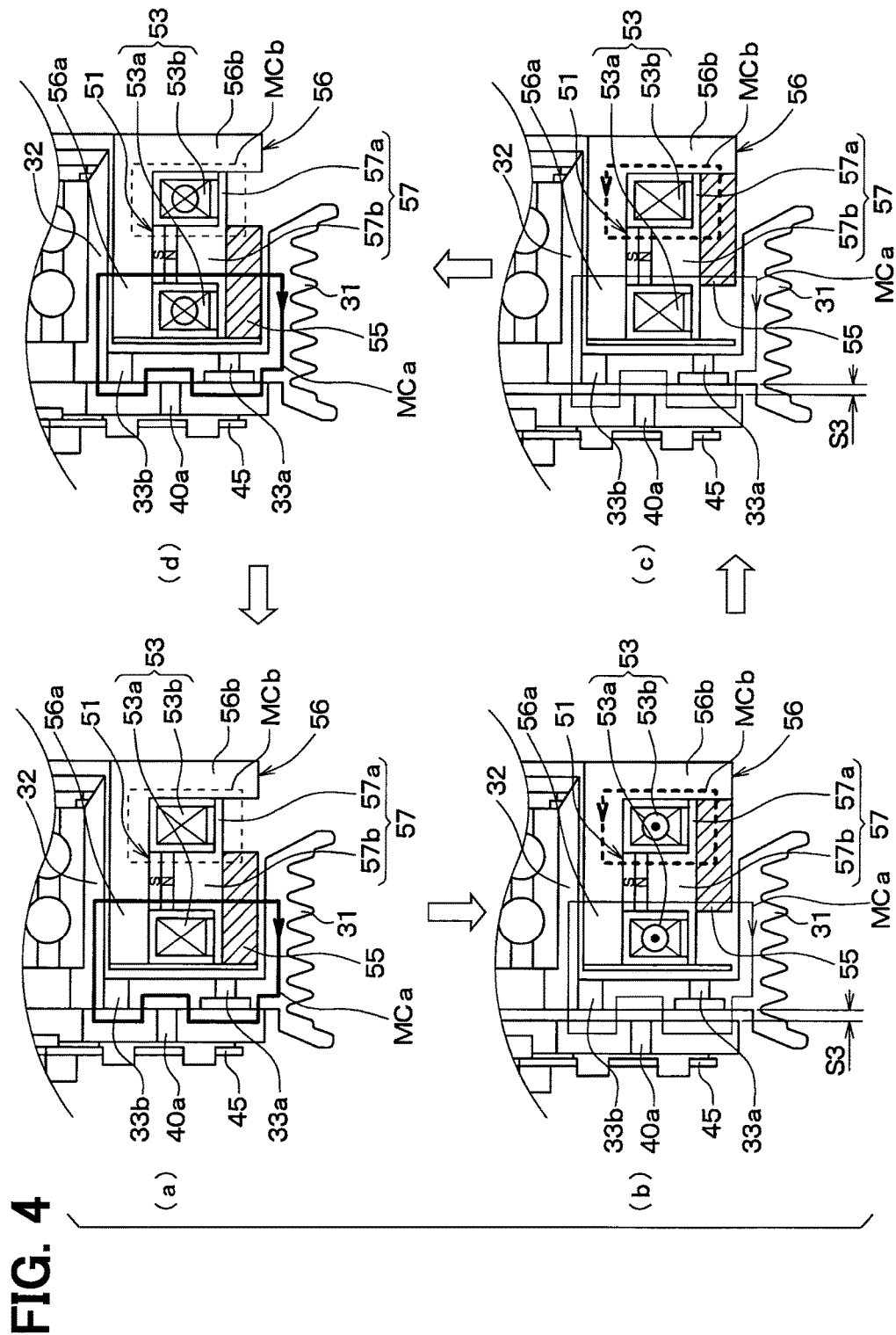
FIG. 4(a) is a view showing a state in which a pulley and an armature are connected to each other.
FIG. 4(b) is a view showing an operation for separating the pulley from the armature.
FIG. 4(c) is a view showing a state in which the pulley and the armature are separated from each other.
FIG. 4(d) is a view illustrating an operation for connecting the pulley to the armature.

First, when the pulley 30 and the armature 40 are connected to each other as shown in FIG. 4(*a*), the movable member 55 is positioned at the first position.

In this case, the magnetic resistance of the attracting magnetic circuit MCa, which is formed by the permanent magnet 51, is reduced in comparison with the magnetic resistance of the attracting magnetic circuit that is obtained when the movable member 55 is positioned at the second position. Accordingly, the magnetic force generated by the attracting magnetic circuit MCa increases.

A magnetic force, which is generated by the attracting magnetic circuit MCa shown by a thick solid line in FIG. 4(*a*), acts as magnetic attraction that causes the pulley 30 and the armature 40 to be connected to each other.

The attracting magnetic circuit MCa is a magnetic circuit in which magnetic flux passes through the yoke 57, the movable member 55, the outer cylindrical portion 31 of the pulley 30, the armature 40, the end face portion 33, the armature 40, the inner cylindrical portion 32, the cylinder portion 56*a* of the stator housing 56, and the magnet 51 in this order as shown by a thick solid line in FIG. 4(*a*).

As described above, magnetic flux passes through the attracting magnetic circuit MCa of the present embodiment so as to avoid the non-magnetic portion 40*a* of the armature 40 and the non-magnetic portions 33*a* and 33*b* of the pulley 30. For this reason, magnetic flux passes through a boundary between the pulley 30 and the armature 40 four times. Accordingly, a large force can be made to act between the pulley 30 and the armature 40 as the magnetic attraction.

Further, when the movable member 55 is positioned at the first position, a gap is formed between the movable member 55 and the wall portion 56*b* of the stator plate 56. This gap reduces a magnetic force, which is generated by the non-attracting magnetic circuit MCb, by increasing the magnetic resistance of the non-attracting magnetic circuit MCb. The non-attracting magnetic circuit MCb is a magnetic circuit that is formed by the permanent magnet 51 and is different from the attracting magnetic circuit MCa.

The non-attracting magnetic circuit MCb is a magnetic circuit in which magnetic flux passes through the movable member 55, the stator plate 56, the permanent magnet 51, and the yoke 57 in this order as shown by a thin broken line in FIG. 4(*a*). A magnetic force, which is generated by the non-attracting magnetic circuit MCb, does not function as attraction that causes the pulley 30 and the armature 40 to be connected to each other.

In addition, when the movable member 55 is positioned at the first position, the amount of magnetic flux of the attracting magnetic circuit MCa increases in comparison with the amount of magnetic flux of the attracting magnetic circuit that is obtained when the movable member 55 is positioned at the second position. Accordingly, the movable member 55 is kept at the first position.

In the present embodiment, the elastic force of the leaf spring 45 is set to be smaller than the magnetic attraction that is generated in the attracting magnetic circuit MCa when the movable member 55 is positioned at the first position. Accordingly, even though power is not supplied to the electromagnetic coil 53, a state in which the pulley 30 and the armature 40 are connected to each other is maintained. That is, the rotational drive force applied from the engine 10 is transmitted to the compressor 2.

Next, the control unit 6 starts to supply power to the electromagnetic coil 53 in a first direction. At this time, current flows in the first coil 53*a* to the front of the plane of paper from the back of the plane of paper and current flows in the second coil 53*b* to the front of the plane of paper from the back of the plane of paper as shown in FIG. 4(*b*). For this reason, the first coil 53*a* reduces the amount of magnetic flux passing through the attracting magnetic circuit MCa, and the second coil 53*b* increases the amount of magnetic flux passing through the non-attracting magnetic circuit MCb. Accordingly, the magnetic force, which is generated by the non-attracting magnetic circuit MCb shown by a thick broken line in FIG. 4(*b*), becomes larger than the magnetic attraction that is generated by the attracting magnetic circuit MCa shown by a thin solid line in FIG. 4(*b*).

As a result, a drive force, which moves the movable member 55 to the second side, is applied to the movable member 55 through the magnetic force that is generated from the non-attracting magnetic circuit MCb. For this reason, the movable member 55 is guided by the guide portion 57*a* of the yoke 57 and moves to the second position from the first position. After that, the control unit 6 ends the supply of power to the electromagnetic coil 53.

As shown in FIG. 4(*c*), the gap between the movable member 55 and the wall portion 56*b* of the stator plate 56 is removed with the movement of the movable member 55. For this reason, the magnetic resistance of the non-attracting magnetic circuit MCb is reduced in comparison with the magnetic resistance of the non-attracting magnetic circuit that is obtained when the pulley 30 and the armature 40 are connected to each other. Accordingly, the amount of magnetic flux passing through the non-attracting magnetic circuit MCb increases. As a result, the movable member 55 is kept at the second position.

Here, when the movable member 55 is positioned at the second position, a gap is formed between the movable member 55 and the end face portion 33 of the pulley 30 as shown in FIG. 4(*c*). Since the magnetic resistance of the attracting magnetic circuit MCa is increased due to this gap in comparison with the magnetic resistance of the attracting magnetic circuit that is obtained when the pulley 30 and the armature 40 are connected to each other, the magnetic attraction generated from the attracting magnetic circuit MCa is reduced. As a result, the repulsive force of the leaf spring 45 becomes larger than the magnetic attraction that is generated from the attracting magnetic circuit MCa. Accordingly, the pulley 30 and the armature 40 are separated from each other. That is, since the pulley 30 and the armature 40 are separated from each other, the rotational drive force applied from the engine 10 is not transmitted to the compressor 2.

Next, the control unit 6 starts to supply power to the electromagnetic coil 53 in a second direction. The second direction is a direction that is opposite to the first direction. For this reason, current flows in the first coil portion 53*a* to the back of the plane of paper from the front of the plane of paper, and current flows in the second coil portion 53*b* to the back of the plane of paper from the front of the plane of paper, as shown in FIG. 4(*d*). Accordingly, the first coil portion 53*a* increases the amount of magnetic flux passing through the attracting magnetic circuit MCa, and the second coil portion 53*b* reduces the amount of magnetic flux passing through the non-attracting magnetic circuit MCb. Therefore, the magnetic attraction, which is generated by the attracting magnetic circuit MCa, becomes larger than the magnetic force that is generated by the non-attracting magnetic circuit MCb.

As a result, a drive force, which moves the movable member 55 to the first side in the axial direction, is applied to the movable member 55 through the magnetic force that is generated from the attracting magnetic circuit MCa. For this reason, the movable member 55 is guided by the guide portion 57a of the yoke 57 and moves to the first position from the second position. After that, the control unit 6 ends the supply of power to the electromagnetic coil 53.

The gap between the movable member 55 and the end face portion 33 of the pulley 30 is removed with the movement of the movable member 55, and becomes the state shown in FIG. 4(a). For this reason, the magnetic attraction of the attracting magnetic circuit MCa is reduced in comparison with the magnetic attraction of the attracting magnetic circuit that is obtained when the pulley 30 and the armature 40 are separated from each other, and the amount of magnetic flux of the attracting magnetic circuit MCa increases. As a result, since the magnetic attraction becomes larger than the repulsive force of the leaf spring 45, the pulley 30 and the armature 40 are connected to each other. That is, a rotational drive force starts to be transmitted to the compressor 2 from the engine 10.

According to the present embodiment that has been described above, when the control unit 6 starts to supply power to the electromagnetic coil 53 in the first direction, the first coil 53a reduces the amount of magnetic flux passing through the attracting magnetic circuit MCa. Further, the second coil 53b increases the amount of magnetic flux passing through the non-attracting magnetic circuit MCb. Accordingly, the magnetic force that is generated by the non-attracting magnetic circuit MCb becomes larger than the magnetic attraction that is generated by the attracting magnetic circuit MCa. At this time, a drive force, which moves the movable member 55 to the second side in the axial direction, is applied to the movable member 55 through the magnetic force that is generated by the non-attracting magnetic circuit MCb. As a result, the movable member 55 is guided by the guide portion 57a and moves to the second position from the first position.

When the control unit 6 starts to supply power to the electromagnetic coil 53 in the second direction, the first coil portion 53a increases the amount of magnetic flux passing through the attracting magnetic circuit MCa and the second coil portion 53b generates an electromagnetic force that reduces the amount of magnetic flux passing through the non-attracting magnetic circuit MCb. Accordingly, the magnetic force that is generated by the attracting magnetic circuit MCa becomes larger than the magnetic force that is generated by the non-attracting magnetic circuit MCb. At this time, a drive force is applied to the movable member 55 toward the first side in the axial direction through the magnetic force that is generated by the attracting magnetic circuit MCa. As a result, the movable member 55 is guided by the guide portion 57a and moves to the first position from the second position.

When the control unit 6 supplies power to the electromagnetic coil 53 as described above, the movable member 55 is guided by the guide portion 57a and can reliably move between the first position and the second position. That is, while the movable member 55 slides on the yoke 57, the movable member 55 can reliably perform a movement step when turning ON/OFF the clutch mechanism 20.

Here, a friction force generated between the movable member 55 and the electromagnetic coil 53, the permanent magnet 51, or the like is uncertain in a clutch mechanism in which the guide portion 57a is not used (a comparison example). Accordingly, the electromagnetic force generated from the electromagnetic coil 53 needs to be designed with redundancy to obtain reliable operation of the movable member 55, and therefore there was a need for sacrifices in cost, physical size, power consumption when turning the member ON/OFF, and the like.

Here, a friction force F, which is generated when the movable member 55 slides on the yoke 57, is expressed as follows:

$$F = \mu \cdot N$$

μ: coefficient of friction

That is, in the clutch mechanism of the comparison example, when the movable member 55 moves, the movable member 55 may come into contact with the electromagnetic coil 53, come into direct contact with the permanent magnet 51, or come into contact with both the electromagnetic coil 53 and the permanent magnet 51. For this reason, there is a problem in that the friction force F cannot be stabilized.

In contrast, the movable member 55 can always move while sliding on the guide portion 57a of the yoke 57 in the present embodiment. Accordingly, since a friction force caused by sliding, and thus, an electromagnetic force required to move the movable member 55 against a friction force can be estimated, the electromagnetic coil 53 for that friction force can be designed. Therefore, reliable operation of the movable member 55, and thus an operation for turning on/off the clutch mechanism 20, can be assured.

In the present embodiment, the movable member 55 is formed of a ring-shaped magnetic member. For this reason, the movable member 55 can be easily manufactured.

In the present embodiment, a solid lubricant film, which ensures a satisfactory sliding state between the movable member 55 and the guide portion 57a and reduces a coefficient μ of friction, is formed on the outer peripheral surface of the guide portion 57a (that is, the surface of the guide portion 57a facing the movable member 55) through surface treatment.

Here, the sliding surfaces of the movable member 55 and the guide portion 57a are worn out according to the number of times of operation due to a friction force that is generated on the contact surface. When significant wear occurs on the contact surface, there is a concern that the magnetic force (that is, attraction between the pulley 30 and the armature 40) may be reduced due to an increase of the gap in the attracting magnetic circuit MCa. Alternatively, there is a concern that the movable member 55 may be caught in the movement space due to an excessive inclination of the movable member 55 caused by an increase of a clearance between the movable member 55 and the guide portion 57a, and inconveniences such as malfunctions may occur.

Meanwhile, the supply of a lubricant or the sealing of grease to suppress the wear of the sliding surfaces of the movable member 55 and the yoke 57 is also considered.

However, in the event lubricant or the like leaks to the friction surface transmitting power when the lubricant or the like is employed in a dry type single-plate clutch mechanism such as the clutch mechanism 20 of the present embodiment, slipping or the like is caused and a required torque transmitting performance cannot be obtained. For this reason, a redundant seal structure is required.

Accordingly, in the present embodiment, a solid lubricant film is formed on the outer peripheral surface of the guide portion 57a through surface treatment as described above. For this reason, the supply of a lubricant, the sealing of grease, or the like does not need to be performed to the sliding surfaces of the movable member 55 and the guide portion 57a. Accordingly, since the movable member 55 slides without lubrication as in the present embodiment, an effect of simplifying the structure of the stator 50 is obtained.

In the present embodiment, heat treatment has been performed on the movable member 55 in order to harden the movable member 55. For this reason, the movable member 55 can be hardened. As a result, wear, which occurs on the surface of the movable member 55 facing the guide portion 57a, can be suppressed. Accordingly, even though the movable member 55 slidably moves on the guide portion 57a, the movable member 55 is not easily worn out. Therefore, the movable member 55 is able to smoothly slide on the guide portion 57a.

Here, since heat treatment is performed on the movable member 55 to harden the movable member 55 and a soft solid lubricant film is formed on the guide portion 57a, the soft guide portion 57a can always be worn out. Accordingly, the progression of wear over time can be easily estimated.

Meanwhile, the example in which heat treatment is performed on the movable member 55 to harden the movable member 55 has been described in the first embodiment. However, instead of the heat treatment, hard plating may be performed on the surface of the movable member 55 facing the guide portion 57a to harden the movable member 55.

In addition, the example in which heat treatment is performed on the movable member 55 to suppress the wear of the movable member 55 and a solid lubricant film is formed on the guide portion 57a has been described in the first embodiment. However, instead of this, heat treatment may be performed on the guide portion 57a to suppress the wear of the guide portion 57a and a solid lubricant film may be formed on the movable member 55.

In this case, instead of the heat treatment performed on the guide portion 57a, hard plating may be performed on the surface of the guide portion 57a facing the movable member 55.

Second Embodiment

The example in which the yoke 57 is made of a magnetic material has been described in the first embodiment. However, instead of this, an example in which a composite member made of a magnetic material and a non-magnetic material is used as a yoke 57 will be described in a second embodiment.

Figure 5:
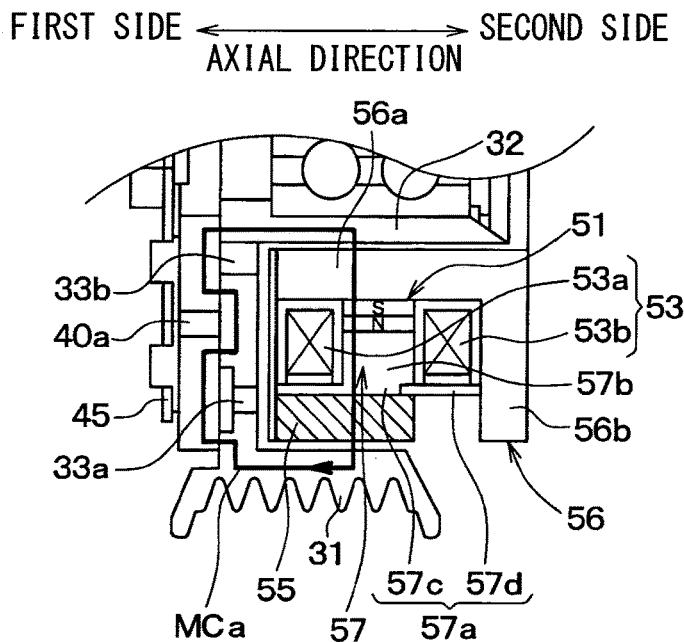
FIG. 5 is a view showing a part of a clutch structure of a second embodiment of the present disclosure.

FIG. 5 is a partial enlarged view of a clutch mechanism 20 of the present embodiment. FIG. 5 is a view corresponding to the portion B of FIG. 2.

In the present embodiment, a guide portion 57a of a yoke 57 includes guide portions 57c and 57d. The guide portion 57d (non-magnetic portion) is formed close to a second coil portion 53b. Specifically, the guide portion 57d is positioned outside the second coil portion 53b in the radial direction of a rotating shaft 2a. The guide portion 57d is formed in the shape of a ring that has the center thereof on the axis of the rotating shaft 2a.

The guide portion 57c (first magnetic portion) is disposed on the first side (that is, the side closer to the first coil portion 53a) of the guide portion 57d in the axial direction. The guide portion 57c is positioned outside the intermediate magnetic portion 57b and the first coil portion 53a in the radial direction of the rotating shaft 2a. The guide portion 57c is formed in the shape of a ring that has the center thereof on the axis of the rotating shaft 2a.

Here, the guide portion 57d is made of a non-magnetic material such as SUS304 (stainless steel). A component, which is made of a magnetic material such as iron and integrally formed with the intermediate magnetic portion 57b, is used as the guide portion 57c.

In the present embodiment, the guide portions 57c and 57d are joined to each other by friction welding (rotary friction welding).

Here, when the guide portions 57c and 57d are joined to each other by partial welding or the like, a clearance is formed between the guide portions 57c and 57d. For this reason, even though surface treatment, which forms a solid lubricant film, is performed on the yoke 57 to allow the movable member 55 to slide well, a crack is formed in the solid lubricant film due to the clearance. Accordingly, there is a concern that the solid lubricant film may be easily peeled off of the yoke.

In contrast, in the present embodiment, the guide portions 57c and 57d are joined to each other by friction welding as described above. For this reason, the yoke 57 can be formed so that a clearance, a joint, and a level difference are not formed between the guide portions 57c and 57d. Accordingly, a coefficient μ of friction between the movable member 55 and the yoke 57 can be reduced. As a result, surface treatment, which forms a solid lubricant film, can be performed on the yoke 57 to allow the movable member 55 to slide well.

Figure 6:
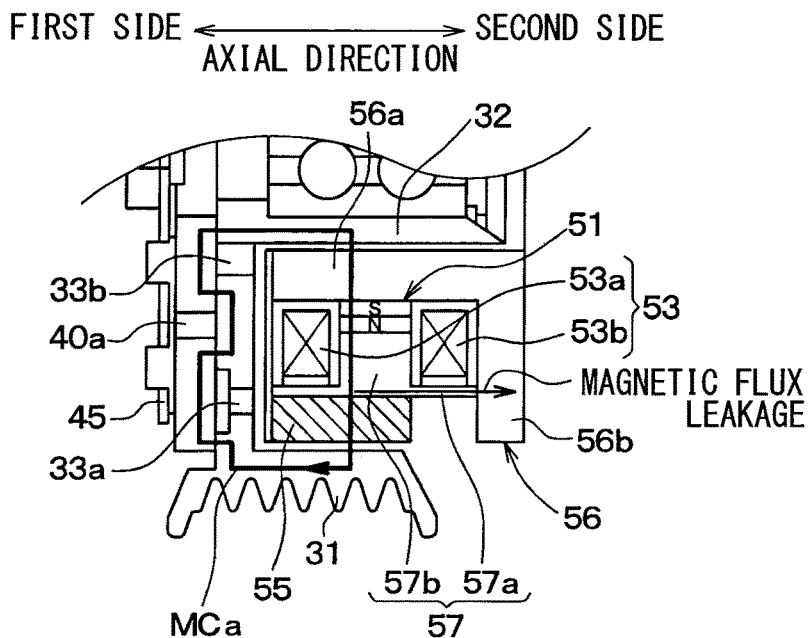
FIG. 6 is a view showing a part of a clutch structure of a comparative example of the second embodiment.

When the movable member 55 is positioned at the first position (clutch ON side) as shown in FIG. 6 in the first embodiment, the attracting magnetic circuit MCa in which magnetic flux passes through the permanent magnet 51, the yoke 57, the movable member 55, the pulley 30, the armature 40, the pulley 30, and the permanent magnet 51 in this order is formed. In this case, there is a concern that a contradictory leak of magnetism (magnetic flux) to the wall portion 56b of the stator housing 56 from the attracting magnetic circuit MCa through the guide portion 57a of the yoke 57 may occur. The leakage of magnetism causes the attraction of the armature 40 to be reduced, that is, causes the torque transmitting performance of the clutch mechanism 20 to deteriorate.

Accordingly, only an end portion of the yoke 57 close to the compressor (OFF magnetic circuit) is provided with a non-magnetic portion as the guide portion 57d in the present embodiment, so that the leakage of magnetism is prevented. Therefore, an effect of obtaining sufficient torque transmitting performance is obtained.

Third Embodiment

The example in which a non-magnetic portion made of stainless steel is disposed on the second side of the yoke 57 in the axial direction as the guide portion 57d has been described in the second embodiment. Instead of this, a gap 57e may be formed on the second side of the yoke 57 in the axial direction as a non-magnetic portion instead of the guide portion 57d as shown in FIG. 7. That is, a gap 57e including air as a non-magnetic material is formed on the second side of the guide portion 57a in the axial direction as a non-magnetic portion. The gap 57e is formed in the shape of a ring that has the center thereof on the axis of the rotating shaft 2a.

Fourth Embodiment

The example in which the gap 57e is formed on the second side of the yoke 57 in the axial direction as a non-magnetic portion has been described in the third embodiment. Instead of this, an example in which gaps 57e and magnetic portions 57f (second magnetic portion) are alternately formed along a circumferential direction around the axis of the rotating shaft 2a as a center on the second side of the yoke 57 in the axial direction will be described in a fourth embodiment.

Figure 9:
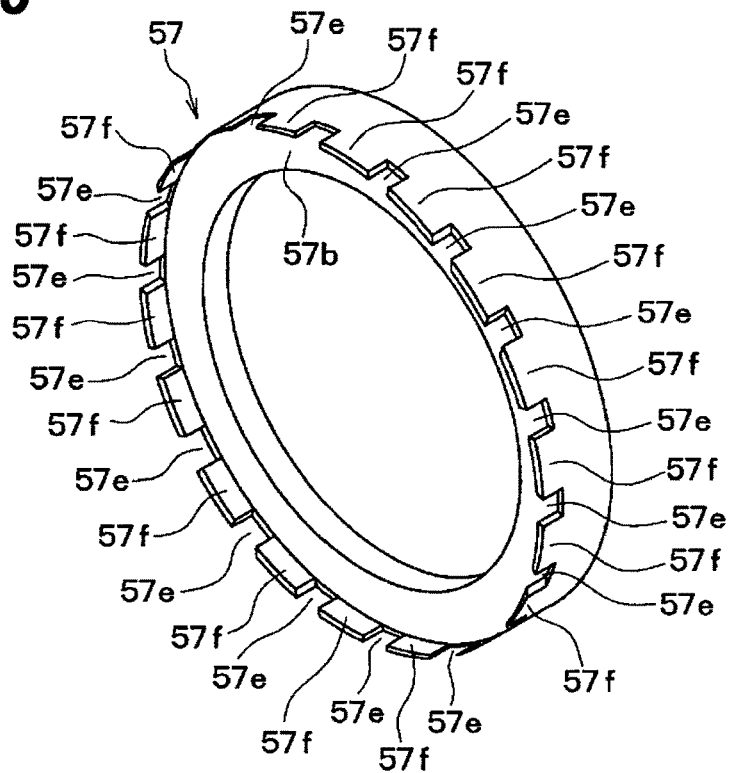
FIG. 9 is a perspective view of the yoke of the fourth embodiment.

FIG. 8(a) is a side view of a yoke 57 of the present embodiment, FIG. 8(b) is a front of the yoke 57 of the present embodiment, and FIG. 9 is a perspective view of the yoke 57 of the present embodiment.

As shown in FIGS. 8 and 9, magnetic portions 57f of the present embodiment, a guide portion 57c, and an intermediate portion 57d are made of a magnetic material, such as iron, so as to be formed integrally with one another. Accordingly, the second side of the yoke 57 in the axial direction is formed in a shape of comb so as to be provided with a plurality of gaps 57e and the plurality of magnetic portions 57f.

According to the present embodiment, the gaps 57e and the magnetic portions 57f are formed alternately one by one in the circumferential direction on the second side of the yoke 57 in the axial direction. Accordingly, a guiding function of the movable member 55 can be ensured while the leakage of magnetism is suppressed. As a result, reliable operation of the movable member 55 can be obtained.

Meanwhile, the example in which the gaps 57e are formed as a non-magnetic portion on the second side of the yoke 57 in the axial direction has been described in the fourth embodiment. However, instead of the gaps 57e, a non-magnetic metal material or a non-magnetic resin material may be used as a non-magnetic portion on the second side of the yoke 57 in the axial direction.

Fifth Embodiment

Figure 10:
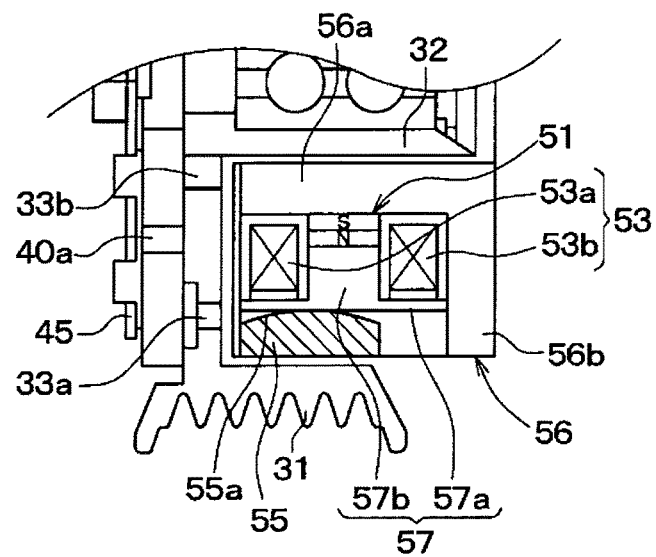
FIG. 10 is a view showing a part of a clutch structure of a fifth embodiment of the present disclosure.

The example in which the axial cross-section of the movable member 55 has a rectangular shape has been described in the first embodiment. Instead of this, an example in which the axial cross-section of a movable member 55 has the shape of a barrel will be described in a fifth embodiment, as shown in FIG. 10. The axial cross-section of the movable member 55 is a cross-sectional view that includes the axis of the rotating shaft 2a and is taken along the axis. FIG. 10 is a partial cross-sectional view of a clutch mechanism 20 of the present embodiment. The hatching of other components except for the movable member 55 will be omitted in FIG. 10 to clarify the contents shown in FIG. 10.

In the present embodiment, the axial cross-section of the movable member 55 is formed in a shape having an arc-shaped portion 55a formed in an arc shape, which is convex in a direction perpendicular to the outer peripheral surface of the guide portion 57a on the side closer to the guide portion 57a, on the inside of the movable member 55 in the radial direction of the rotating shaft 2a. The outer peripheral surface of the guide portion 57a is a surface of the guide portion 57a facing the movable member 55.

In the present embodiment, the movable member 55 is formed in a shape having the arc-shaped portion 55a as described above. For this reason, contact surface pressure, which is generated between the movable member 55 and the yoke 57 when the movable member 55 moves while sliding on the yoke 57, can be reduced.

In the first embodiment, the movable member 55 is formed in the shape of a ring that has corners on the side close to the guide portion 57a. Accordingly, the corners of the movable member 55 come into contact with the yoke 57 and an excessive edge load is generated. For this reason, there is a concern that smooth sliding may be hindered and early wear and the like may be caused.

In contrast, since the movable member 55 is formed so as to have a cross-sectional shape including the arc-shaped portion 55a shown in FIG. 10 in the present embodiment, the corners of the movable member 55 do not come into contact with the yoke 57. Accordingly, the generation of an excessive contact load can be prevented when the movable member 55 moves.

Sixth Embodiment

Figure 11:
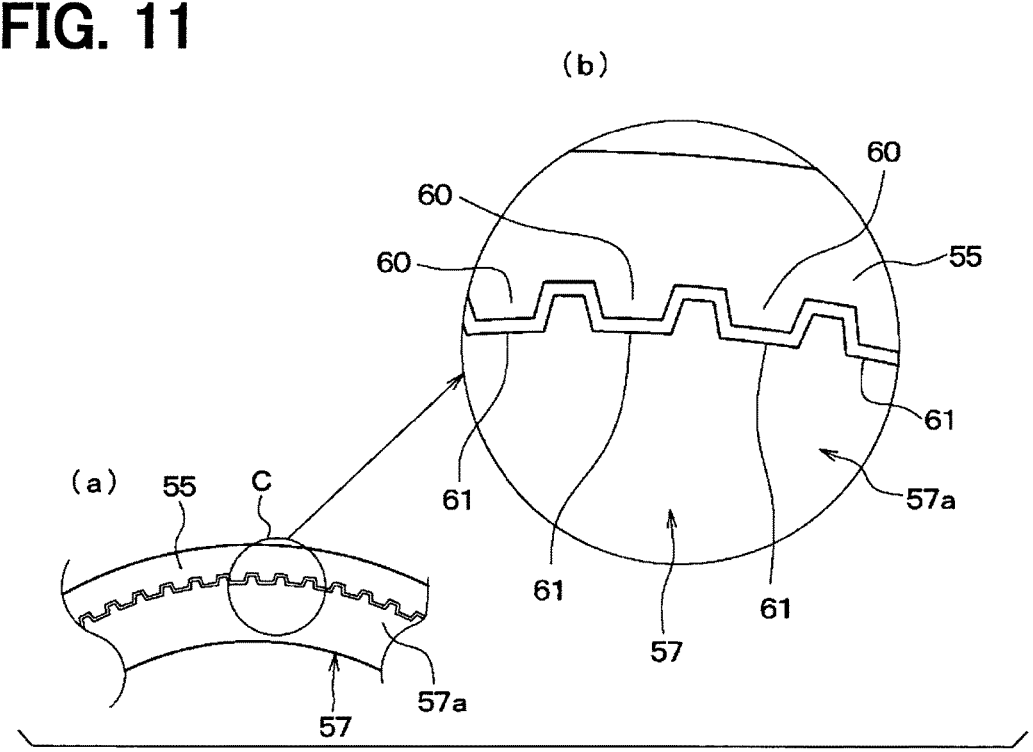
FIG. 11 is a view showing a part of a yoke and a movable member of a sixth embodiment of the present disclosure.

An example in which a movable member 55 and a yoke 57 are fitted to each other using serrations as shown in FIG. 11 will be described in a sixth embodiment.

FIG. 11(a) is a partial enlarged view of the movable member 55 and the yoke 57 of the present embodiment that are seen from the first side in the axial direction. FIG. 11(b) is an enlarged view of a portion C of FIG. 11(a).

The movable member 55 is provided with a plurality of protruding portions 60 (first engagement portion) that protrude toward the guide portion 57a of the yoke 57. The plurality of protruding portions 60 are formed between a portion of the movable member 55 facing the first coil portion 53a and a portion of the movable member 55 facing the second coil portion 53b (that is, the axial direction). The plurality of protruding portions 60 are arranged in a circumferential direction around the axis of the rotating shaft 2a as a center.

The guide portion 57a is provided with a plurality of groove portions 61 (second engagement portion) to which the plurality of protruding portions 60 are fitted (engaged) and which are formed between the first and second positions. That is, the guide portion 57a is provided with the groove portions 61 that are formed between the first coil portion 53a and the second coil portion 53b (that is, in the axial direction).

In the present embodiment having the above-mentioned structure, the movable member 55 is provided with the plurality of protruding portions 60 and the guide portion 57a is provided with the plurality of groove portions 61. Further, the protruding portions 60 and the groove portions 61 are engaged with each other so as to be slidable in the axial direction. For this reason, the plurality of protruding portions 60 are guided by the plurality of groove portions 61 of the guide portion 57a, so that the movable member 55 moves in the axial direction. Accordingly, the guide portion 57a can reliably guide the movement of the movable member 55 between the first and second positions.

Other Embodiments

The example in which the movable member 55 is provided with the protruding portions 60 and the guide portion 57a is provided with the groove portions 61 has been described in the sixth embodiment. However, instead of this, the movable member 55 may be provided with the groove portions 61 (first engagement portion) and the guide portion 57a may be provided with the protruding portions 60 (second engagement portion).

Further, as long as the first and second engagement portions are engaged with each other so as to be slidable in the moving direction of the movable member 55, the first and second engagement portions are not limited to the protruding portions 60 and the groove portions 61 shown in FIG. 11. That is, various guide mechanisms, which include a first engagement portion and a second engagement portion formed so as to be engaged with the first engagement portion while sliding, can be employed.

The examples in which the engine 10 is used as a drive source have been described in the first to sixth embodiments, but devices other than the engine 10 may be used as a drive source instead of the engine 10.

The examples in which the compressor 2 is used as a transmission destination to which a rotational drive force is transmitted from the engine 10 have been described in the first to sixth embodiments. However, instead of this, devices other than the compressor 2 may be used as a transmission destination to which a rotational drive force is transmitted from the engine 10.

The examples in which surface treatment for ensuring a satisfactory sliding state between the movable member 55 and the guide portion 57a and reducing a coefficient μ of friction is performed on the surface of the guide portion 57a facing the movable member 55 have been described in the first to sixth embodiments. However, instead of this, heat treatment for suppressing wear may be performed on the surface of the guide portion 57a facing the movable member 55.

The examples in which the moving direction of the movable member 55 is set to the axial direction of the rotating shaft 2a have been described in the first to sixth embodiments. However, instead of this, the moving direction of the movable member 55 may be set to directions other than the axial direction of the rotating shaft 2a.

The examples in which the movable member 55 is disposed outside the permanent magnet 51 and the electromagnetic coil 53 in the radial direction have been described in the first to sixth embodiments. However, the following (1) and (2) may be satisfied in addition to this.

(1) The movable member 55 may be disposed inside the permanent magnet 51 and the electromagnetic coil 53 in the radial direction. In this case, the guide portion 57a may be disposed inside the permanent magnet 51 and the electromagnetic coil 53 in the radial direction and outside the movable member 55 in the radial direction.

(2) The permanent magnet 51 and the electromagnetic coil 53 may be disposed inside the movable member 55 in the radial direction, and the permanent magnet 51 and the electromagnetic coil 53 may be disposed outside the movable member 55 in the radial direction. In this case, the guide portion may be disposed inside the permanent magnet 51 and the electromagnetic coil 53 in the radial direction, and the guide portion may be disposed outside the permanent magnet 51 and the electromagnetic coil 53 in the radial direction.

Meanwhile, the present disclosure is not limited to the above-mentioned embodiments, and may be appropriately modified.

What is claimed is:

1. A clutch mechanism comprising:
a driving-side rotating body that is rotated by a rotational drive force output from a drive source;
a driven-side rotating body, to which the rotational drive force is transmitted, that is connected to the driving-side rotating body;
a permanent magnet that forms, together with the driving-side rotating body and the driven-side rotating body, an attracting magnetic circuit which generates a magnetic force that causes the driving-side rotating body and the driven-side rotating body to be connected to each other, the permanent magnet forming a non-attracting magnetic circuit different from the attracting magnetic circuit;
an electromagnetic coil that changes a magnetic force generated from the attracting magnetic circuit and a magnetic force generated from the non-attracting magnetic circuit;
a movable member that is made of a magnetic material and displaceable, the movable member positioning at a first position where a magnetic resistance of the attracting magnetic circuit is smaller when the driving-side rotating body and the driven-side rotating body are connected to each other than when the driving-side rotating body and the driven-side rotating body are separated from each other, and the movable member positioning at a second position where the magnetic resistance of the non-attracting magnetic circuit is smaller when the driving-side rotating body and the driven-side rotating body are separated from each other than when the driving-side rotating body and the driven-side rotating body are connected to each other;
a control unit that
moves the movable member, to a side of the first position from a side of the second position using the magnetic force generated from the attracting magnetic circuit, by supplying power to the electromagnetic coil so that the magnetic force generated from the attracting magnetic circuit is larger than the magnetic force generated from the non-attracting magnetic circuit, and
moves the movable member, to the side of the second position from the side of the first position using the magnetic force generated from the non-attracting magnetic circuit, by supplying power to the electromagnetic coil so that the magnetic force generated from the non-attracting magnetic circuit is larger than the magnetic force generated from the attracting magnetic circuit; and
a guide portion that guides movement of the movable member between the side of the first position and the side of the second position, wherein
the electromagnetic coil includes
a first coil portion that increases and decreases the magnetic force generated from the attracting magnetic circuit, and
a second coil portion that increases and decreases the magnetic force generated from the non-attracting magnetic circuit,
the guide portion includes
a first magnetic portion that is disposed adjacent to the first coil portion and is made of a magnetic material, and
a non-magnetic portion that is disposed adjacent to the second coil portion and is made of a non-magnetic material,
the first magnetic portion forms the attracting magnetic circuit and the non-attracting magnetic circuit, and
the non-magnetic portion suppresses leakage of magnetic flux from the attracting magnetic circuit.

2. The clutch mechanism according to claim 1, wherein the guide portion is made of a magnetic material and forms the attracting magnetic circuit and the non-attracting magnetic circuit.

3. The clutch mechanism according to claim 1, wherein the first magnetic portion and the non-magnetic portion are joined to each other by friction welding to constitute the guide portion.

4. The clutch mechanism according to claim 1, wherein
the first magnetic portion is ring shaped, and
the non-magnetic portion is ring shaped and has a center on an axis of the first magnetic portion.

5. The clutch mechanism according to claim 1, wherein
the guide portion includes a second magnetic portion that is disposed, relative to the first magnetic portion, closer to the second coil portion and is made of a magnetic material, and
the second magnetic portion is disposed adjacent to the non-magnetic portion in a circumferential direction centered on an axis of the first magnetic portion.

6. The clutch mechanism according to claim 5, wherein
the guide portion includes a plurality of the non-magnetic portions and a plurality of the second magnetic portions, and
the plurality of the non-magnetic portions and the plurality of the second magnetic portions are arranged alternately one by one in the circumferential direction.

7. The clutch mechanism according to claim 5, wherein
a gap including air as the non-magnetic material is defined as the non-magnetic portion of the guide portion.

8. The clutch mechanism according to claim 1, wherein
a film is formed, through surface treatment, on a surface of the guide portion facing the movable member to reduce a coefficient of friction between the movable member and the guide portion as compared to the coefficient of friction if the film were not provided.

9. The clutch mechanism according to claim 1, wherein
heat treatment, which suppresses wear with the movable member, is performed on a side of the guide portion that faces the movable member.

10. The clutch mechanism according to claim 1, wherein
a film is formed, through surface treatment, on a surface of the movable member that faces the guide portion to reduce a coefficient of friction between the movable member and the guide portion as compared to the coefficient of friction if the film were not provided.

11. The clutch mechanism according to claim 1, wherein
heat treatment, which suppresses wear with the guide portion, is performed on a side of the movable member that faces the guide portion.

12. The clutch mechanism according to claim 1, wherein
the movable member is provided with a first engagement portion, and
the guide portion is provided with a second engagement portion that is slidably engaged with the first engagement portion and guides movement of the movable member.

13. The clutch mechanism according to claim 12, wherein
the first engagement portion is a protruding portion that protrudes toward the guide portion, and
the second engagement portion is a groove portion which is provided on the guide portion spanning between the side of the first position and the side of the second position, the protruding portion fitting into the groove portion.

14. The clutch mechanism according to claim 12, wherein
the second engagement portion is a protruding portion that protrudes toward the movable member, and
the first engagement portion is a groove portion which is provided on the movable member spanning between the side of the first position and the side of the second position, the protruding portion fitting into the groove portion.

15. The clutch mechanism according to claim 1, wherein
the movable member is ring shaped and has a center on a center of rotation of the driving-side rotating body.

16. The clutch mechanism according to claim 15, wherein
the movable member includes an arc-shaped portion having a cross-section, on which an axis of the driving-side rotating body is included and which is taken along the axis, formed in an arc shape that protrudes toward the guide portion, and
the arc-shaped portion of the movable member is movable between the first position and the second position by sliding on the guide portion.

17. A clutch mechanism comprising:
a driving-side rotating body that is rotated by a rotational drive force output from a drive source;
a driven-side rotating body, to which the rotational drive force is transmitted, that is connected to the driving-side rotating body;
a permanent magnet that forms, together with the driving-side rotating body and the driven-side rotating body, an attracting magnetic circuit which generates a magnetic force that causes the driving-side rotating body and the driven-side rotating body to be connected to each other, the permanent magnet forming a non-attracting magnetic circuit different from the attracting magnetic circuit;
an electromagnetic coil that changes a magnetic force generated from the attracting magnetic circuit and a magnetic force generated from the non-attracting magnetic circuit;
an intermediate magnetic portion;
a movable member that is made of a magnetic material and displaceable, the movable member positioning at a first position where a magnetic resistance of the attracting magnetic circuit is smaller when the driving-side rotating body and the driven-side rotating body are connected to each other than when the driving-side rotating body and the driven-side rotating body are separated from each other, and the movable member positioning at a second position where the magnetic resistance of the non-attracting magnetic circuit is smaller when the driving-side rotating body and the driven-side rotating body are separated from each other than when the driving-side rotating body and the driven-side rotating body are connected to each other;
a control unit that
moves the movable member, to a side of the first position from a side of the second position using the magnetic force generated from the attracting magnetic circuit, by supplying power to the electromagnetic coil so that the magnetic force generated from the attracting magnetic circuit is larger than the magnetic force generated from the non-attracting magnetic circuit, and
moves the movable member, to the side of the second position from the side of the first position using the magnetic force generated from the non-attracting magnetic circuit, by supplying power to the electromagnetic coil so that the magnetic force generated from the non-attracting magnetic circuit is larger than the magnetic force generated from the attracting magnetic circuit; and
a guide portion that guides movement of the movable member between the side of the first position and the side of the second position, wherein the electromagnetic coil includes
- a first coil portion that increases and decreases the magnetic force generated from the attracting magnetic circuit, and
- a second coil portion that increases and decreases the magnetic force generated from the non-attracting magnetic circuit, the intermediate magnetic portion is disposed between the first coil portion and the second coil portion and is made of a magnetic material, the guide portion is made of a magnetic material and forms the attracting magnetic circuit and the non-attracting magnetic circuit, the intermediate magnetic portion and the guide portion constitute a yoke that forms the attracting magnetic circuit and the non-attracting magnetic circuit, the intermediate magnetic portion and the guide portion are integrally formed by a same material, and the guide portion includes
- a first guide disposed between the movable member and the first coil portion, or
- a second guide disposed between the movable member and the second coil portion.

\* \* \* \* \*